US008351689B2

(12) United States Patent
Turner et al.

(10) Patent No.: US 8,351,689 B2
(45) Date of Patent: Jan. 8, 2013

(54) APPARATUS AND METHOD FOR REMOVING INK LINES AND SEGMENTATION OF COLOR REGIONS OF A 2-D IMAGE FOR CONVERTING 2-D IMAGES INTO STEREOSCOPIC 3-D IMAGES

(75) Inventors: Tara Handy Turner, Marina Del Rey, CA (US); Evan M. Goldberg, Los Angeles, CA (US); Matthew F. Schnittker, Castaic, CA (US); Joseph W. Longson, Castaic, CA (US); Robert M. Neuman, Santa Clarita, CA (US)

(73) Assignee: Disney Enterprises, Inc., Burbank, CA (US)

( * ) Notice: Subject to any disclaimer, the term of this patent is extended or adjusted under 35 U.S.C. 154(b) by 590 days.

(21) Appl. No.: 12/571,418

(22) Filed: Sep. 30, 2009

(65) Prior Publication Data
US 2011/0075922 A1   Mar. 31, 2011

(51) Int. Cl.
*G06K 9/00* (2006.01)
(52) U.S. Cl. .......................... 382/162; 382/154; 382/164
(58) Field of Classification Search .................. 382/162, 382/164, 131, 128, 154, 294; 378/98.12; 342/78, 176; 348/E13.019; 345/424, 426, 345/505, 592; 359/466; 600/437
See application file for complete search history.

(56) References Cited

U.S. PATENT DOCUMENTS

| | | | | |
|---|---|---|---|---|
| 5,499,323 A * | 3/1996 | Doi et al. | ...................... | 345/426 |
| 6,664,961 B2 * | 12/2003 | Ray et al. | ...................... | 345/424 |
| 7,254,265 B2 | 8/2007 | Naske et al. | | |
| 7,573,475 B2 | 8/2009 | Sullivan et al. | | |
| 7,925,078 B2 * | 4/2011 | Rhodes | ......................... | 382/154 |

OTHER PUBLICATIONS

Johnston, Scott F., "Non-Photorealistic Animation and Rendering," Proceedings of the $2^{nd}$ International Symposium on Non-Photorealistic Animation and Rendering, Annecy, France, pp. 45-ff, 2002.
Petrovic et al., "Shadows for Cel Animation," Proceedings of SIGGRAPH2000, pp. 511-516, 2000.

* cited by examiner

*Primary Examiner* — Anh Hong Do
(74) *Attorney, Agent, or Firm* — Dorsey & Whitney LLP (57) ABSTRACT

Implementations of the present invention involve methods and systems for converting a 2-D image to a stereoscopic 3-D image by segmenting one or more portions of the 2-D image based on one or more pixel color ranges. Further, a matte may be created that takes the shape of the segmented region such that several stereoscopic effects may be applied to the segmented region. In addition, ink lines that are contained within the segmented region may be removed to further define the corresponding matte. Implementations of the present disclosure also include a interface that provides the above functionality to a user for ease of segmentation and region selection. By utilizing the segmentation process, a 2-D image may be converted to a corresponding stereoscopic 3-D image with a perceived depth. Further, this process may be applied to each image of an animated feature film to convert the film from 2-D to 3-D.

20 Claims, 9 Drawing Sheets
(5 of 9 Drawing Sheet(s) Filed in Color)

APPARATUS AND METHOD FOR REMOVING INK LINES AND SEGMENTATION OF COLOR REGIONS OF A 2-D IMAGE FOR CONVERTING 2-D IMAGES INTO STEREOSCOPIC 3-D IMAGES

FIELD OF THE INVENTION

Aspects of the present invention relate to conversion of two dimensional (2-D) multimedia content to stereoscopic three dimensional (3-D) multimedia content. More particularly, aspects of the present invention involve an apparatus and method for segmenting one or more color regions of a 2-D image for purposes of applying a stereoscopic 3-D effect to one or objects of the 2-D image and for removing ink lines from said region to facilitate stereoscopic inflation of the segmented region.

BACKGROUND

Three dimensional (3-D) imaging, or stereoscopy, is a technique used to create the illusion of depth in an image. In many cases, the stereoscopic effect of an image is created by providing a slightly different perspective of a particular image to each eye of a viewer. The slightly different left eye image and right eye image may present two perspectives of the same object, where the perspectives differ from each other in a manner similar to the perspectives that the viewer's eyes may naturally experience when directly viewing a three dimensional scene. For example, in a frame of a stereoscopic 3-D film or video, a corresponding left eye frame intended for the viewer's left eye may be filmed from a slightly different angle (representing a first perspective of the object) from the corresponding right eye frame intended for the viewer's right eye (representing a second perspective of the object). When the two frames are viewed simultaneously or nearly simultaneously, the pixel offset between the left eye frame and the right eye frame provides a perceived depth to the objects in the frames, thereby presenting the combined frames in what appears as three dimensions.

In creating stereoscopic 3-D animation from 2-D animation, one approach to construct the left eye and right eye images necessary for a stereoscopic 3-D effect is to first create a virtual 3-D environment consisting of a computer-based virtual model of the 2-D image, which may or may not include unique virtual models of specific objects in the image. These objects are positioned and animated in the virtual 3-D environment to match the position of the object(s) in the 2-D image when viewed through a virtual camera. For stereoscopic rendering, two virtual cameras are positioned with an offset between them (inter-axial) to simulate the left eye and right eye views of the viewer. Once positioned, the color information from each object in the original image is "cut out" (if necessary) and projected from a virtual projecting camera onto the virtual model of that object. This process is commonly referred to as projection mapping. The color information, when projected in this manner, presents itself along the front (camera facing) side of the object and also wraps around some portion of the front sides of the object. Specifically, any pixel position where the virtual model is visible to the projection camera will display a color that matches the color of the projected 2-D image at that pixel location. Depending on the algorithm used, there may be some stretching or streaking of the pixel color as a virtual model bends toward or away from the camera at extreme angles from perpendicular, but this is generally not perceived by a virtual camera positioned with sufficiently small offset to either side of the projecting camera.

Using this projection-mapped model in the virtual 3-D environment, the left eye and right eye virtual cameras will capture different perspectives of particular objects (representing the left eye and the right eye views) that can be rendered to generate left eye and right eye images for stereoscopic viewing. However, this technique to convert a 2-D image to a stereoscopic 3-D image has several drawbacks. First, creating a virtual 3-D environment with virtual models and cameras is a labor-intensive task requiring computer graphics software and artistic and/or technical talent specialized in the field of 3-D computer graphics. Second, with animated objects, the virtual model must alter over time (frame by frame) to match the movement and deformation of the object in the 2-D image. For the best results, the alteration of the model precisely matches the movement of the object(s) frame by frame. Camera movement may also be taken into account. This is a time consuming task requiring advanced tracking and significant manual labor. In addition, this requires that the 2-D image be recreated almost entirely in a virtual 3-D environment, which also requires significant manual labor, as it implies effectively recreating the entire movie with 3-D objects, backgrounds and cameras.

SUMMARY

One implementation of the present disclosure may take the form of a method of generating stereoscopic images from a two dimensional planar image. The method involves obtaining an image comprising a plurality of regions representing a plurality of color values. The method further involves identifying a particular color value with one of the plurality of regions and identifying each portion of the image that represents a color value within a range of the particular color value. Finally, the method involves applying a stereoscopic volume to the identified portion of the image.

Another implementation of the present disclosure may take the form of a machine-readable storage medium storing a machine-executable code that, when executed by a computer, causes the computer to perform several operations. Such operations include displaying a user interface comprising a image panel configured to display a two dimensional digital image comprising a plurality of discrete color regions. Other operations include receiving a selection of one of the plurality of discrete color regions from an input device, each pixel of the one of the discrete color regions having a first color value, identifying all pixels of the two dimensional digital image having a color value within a range defined by percentage of color change from the first color value, generating a matte based on the identifying of all pixels, the matte retaining the shape of the identified pixels and applying a uniform pixel color to all of the pixels of the matte and displaying the matte in the image panel. Finally, the method may include the operation of applying a stereoscopic volume to the matte.

Yet another implementation of the present disclosure may take the form of a system for generating a stereoscopic frame. The system may comprise a database configured to store a two dimensional frame comprising a plurality of pixels defining a plurality of discrete color regions and one or more computing systems associated with the database to access the two dimensional frame. Further, the computing systems may be configured to perform the operations of retrieving the plurality pixels of the two dimensional frame, generating a user interface configured to manipulate the plurality of pixels and receiving an identification of a point within one of the plurality of discrete color regions. The computing systems may be further configured to perform the operations of identifying a color value associated with the point, identifying all pixel values of the plurality of pixels having a value within a set range of the color value and generating a matte based on the identifying of all pixel values, the matte retaining all pixel values having a value within the range of the color values, applying a uniform pixel value to all of the matte pixels and applying a stereoscopic volume to the matte.

BRIEF DESCRIPTION OF THE DRAWINGS

The patent or application file contains at least one drawing executed in color. copies of this patent or patent application publication with color drawing(s) will be provided by the Office upon request and payment of the necessary fee.

DETAILED DESCRIPTION

Implementations of the present invention involve methods and systems for converting a 2-D multimedia image to a stereoscopic 3-D multimedia image by obtaining layer data for a 2-D image where each layer pertains to some image feature of the 2-D image, duplicating a given image feature or features and offsetting in the x-dimension one or both of the image features to create stereo pairs of the image feature. The layers may be reproduced as a corresponding left eye version of the layer and a corresponding right eye version of the layer. Further, the left eye layer and/or the right eye layer data is shifted by a pixel offset to achieve the desired 3-D effect for each layer of the image. Offsetting more or less of the x value of each pixel in an image feature of a layer creates more or less stereoscopic depth perception. Thus, when two copies of an image feature are displayed with the image feature pixel offset, with appropriate viewing mechanisms, the viewer perceives more or less stereo depth depending on the amount of pixel offset. This process may be applied to each frame of a animated feature film to convert the film from 2-D to 3-D.

Each image feature or features may be segmented and isolated from the rest of the composite 2-D image prior to application of the pixel offset to one or more layers. One technique to segment a region of the 2-D image involves selecting a color of one or more pixels of the 2-D image and a set of tolerances for each color such that each pixel of the 2-D image that falls within the color ranges are segmented from the rest of the 2-D image. As used herein, the term "color" includes all colors of the visible spectrum, including both black and white. Further, a matte may be created that takes the same shape as the segmented region such that several stereoscopic effects may be applied to the segmented region. In addition, for certain types of 2-D animation, ink lines that are contained within the segmented region may be removed to further define the corresponding matte. Implementations of the present disclosure also include an interface that provides the above functionality to a user for ease of segmentation and region selection. These examples refer to 2-D animation with typically flat-shaded characters and ink lines for the purpose of example, but these same techniques can be applied to shaded backgrounds, live action, etc., and ink line removal could be applied to any contiguous color segment including shadows (such as a live action image with shadows on a rippled shirt sleeve.)

For convenience, the embodiments described herein refer to a 2-D image as a "frame" or "2-D frame." However, it should be appreciated that the methods and devices described herein may be used to convert any 2-D multimedia image into a stereoscopic 3-D image, such as 2-D multimedia images including a photo, a drawing, a computer file, a frame of a live action film, a frame of an animated film, a frame of a video or any other 2-D multimedia image. Further, the term "layer" as used herein indicates any portion of a 2-D frame, including any object, set of objects, or one or more portions of an object from a 2-D frame. Thus, the depth model effects described herein may be applied to any portion of a 2-D frame, irrespective of whether the effects are described with respect to layers, objects or pixels of the frame.

Figure 1:
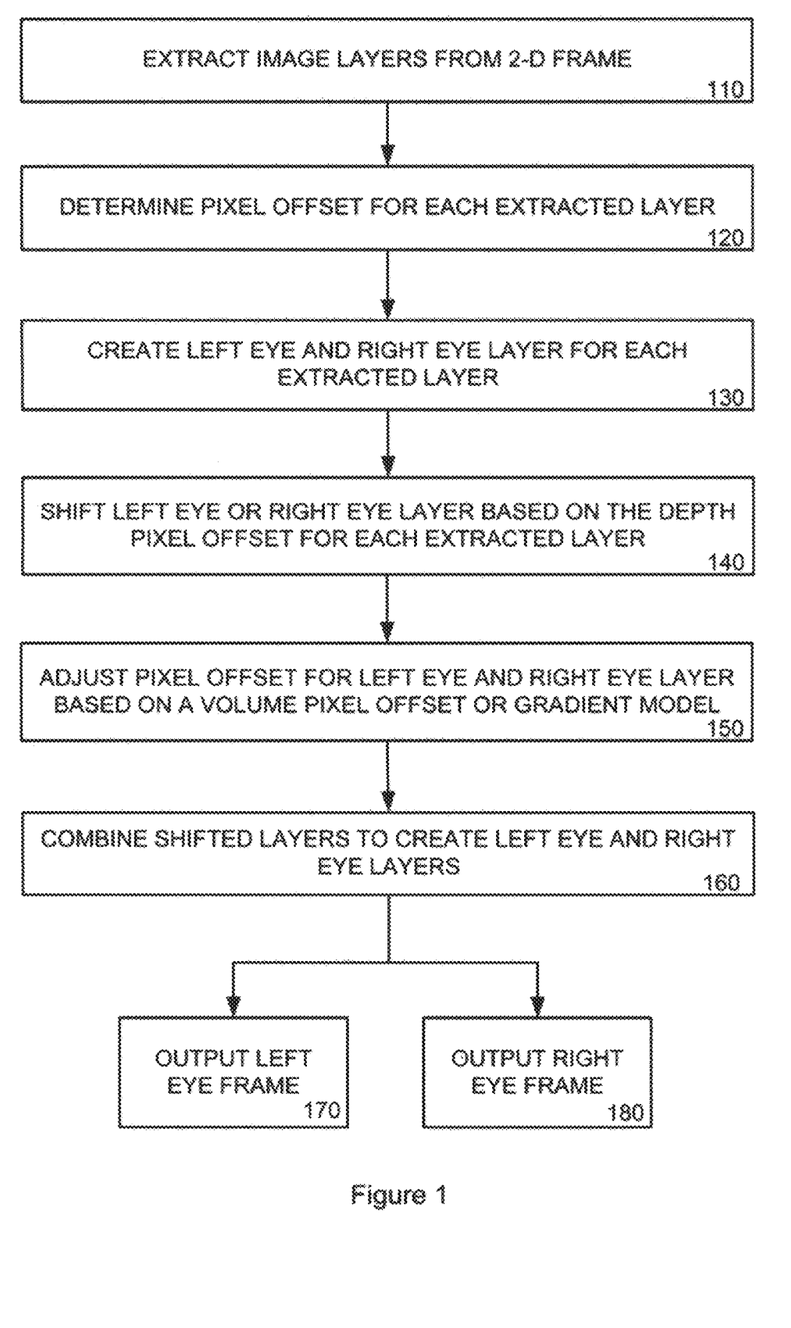
FIG. 1 is a flowchart of a method for converting a 2-D image to a stereoscopic 3-D image by extracting one or more object layers of the 2-D image and applying a pixel offset to each layer.

FIG. 1 is a flowchart of a method for converting a 2-D multimedia frame to a stereoscopic 3-D multimedia frame by utilizing layers of the 2-D frame. Several operations of the method are described in detail in related United States Patent Application titled "METHOD AND SYSTEM FOR UTILIZING PRE-EXISTING IMAGE LAYERS OF A TWO DIMENSIONAL IMAGE TO CREATE A STEREOSCOPIC IMAGE" by Tara Handy Turner et. al., Ser. No. 12/571,407 the contents of which are incorporated in their entirety by reference herein. By performing the following operations for each frame of a 2-D animated film and combining the converted frames in sequence, the animated 2-D film may similarly be converted into a stereoscopic 3-D film. In one embodiment, the operations may be performed by one or more workstations or other computing systems to convert the 2-D frames into stereoscopic 3-D frames.

Figure 2:
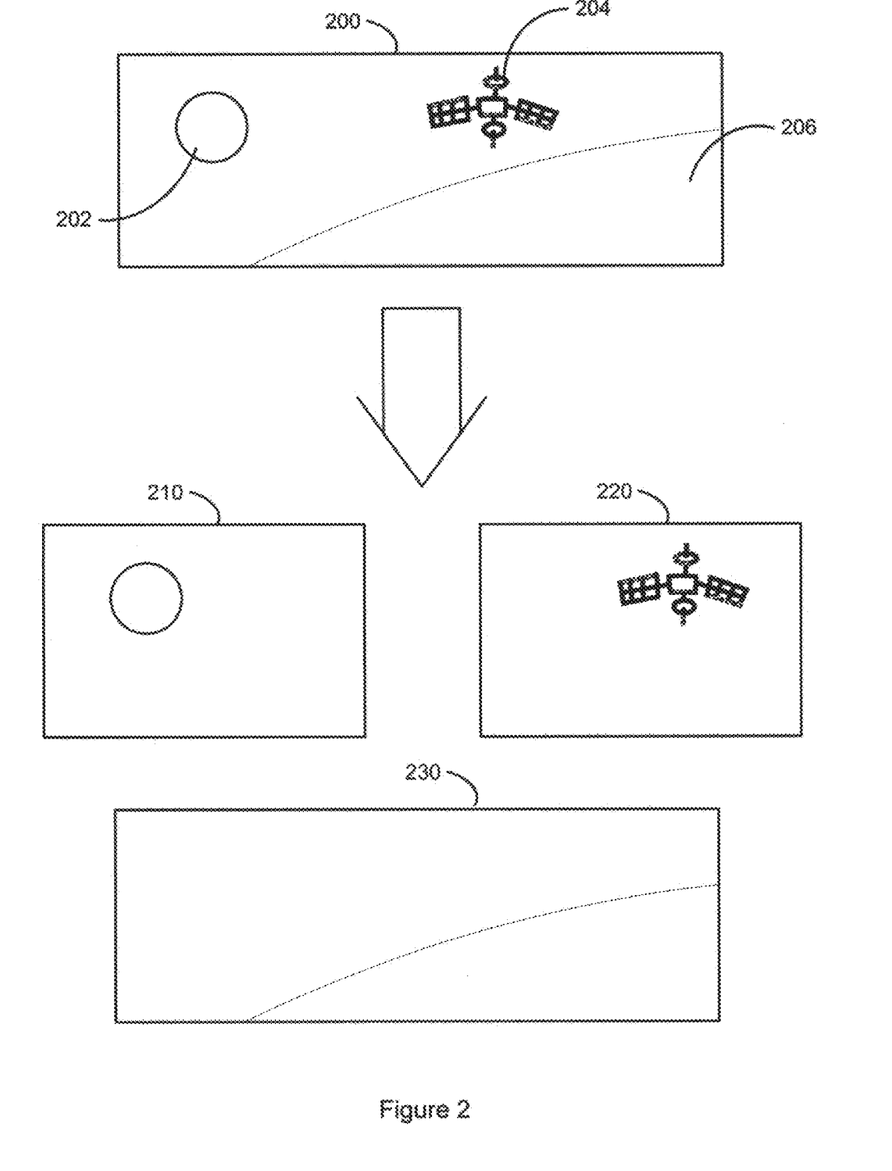
FIG. 2 is a diagram illustrating a plurality of layers of an image of an animated multimedia presentation.

The method may begin in operation 110 where one or more layers are extracted from the 2-D frame by a computer system. A layer may comprise one or more portions of the 2-D frame. The example 2-D frame 200 of FIG. 2 illustrates a space scene including three objects; namely, a moon 202, a satellite 204 and a planet 206. Each of these objects are extracted from the 2-D image or otherwise provided as separate layers of the frame 200. The layers of the 2-D image 200 may include any portion of the 2-D image, such as an object, a portion of the object or a single pixel of the image. As used herein, a layer refers to a collection of data, such as pixel data, for a discrete portion of image data where the meaningful color data exists for the entirety of the image or, in some cases, for some area less than the entirety of image data. For example, if an image consists of a moon 202, satellite 204 and a planet 206, image data for the moon may be provided on a layer and image data for the satellite and planet may be provided on separate and distinct layers.

The layers can be extracted from the composite 2-D frame in several ways. For example, the content of each extracted layer can be digitally extracted from the 2-D frame by a computing system utilizing a rotoscoping tool or other computer image processing tool to digitally remove a given object(s) and insert a given object(s) into a distinct layer. In another example, the layers for a 2-D frame may be digitally stored separately in a computer-readable database. For example, distinct layers pertaining to each frame of a cell animated feature film may be digitally stored in a database, such as the Computer Animation Production System (CAPS) developed by the Walt Disney Company in the late 1980s.

The methods and systems provided herein describe several techniques and a user interface for segmenting a region of a 2-D frame or layer, as well as creating a corresponding matte of the region for the purpose of applying a pixel offset to the region. Generally, these techniques are utilized to segment regions of a layer such that certain 3-D effects may be applied to the region, separate from the rest of the layer. However, in some embodiments, the techniques may also be used to segment regions of a 2-D frame to create the one or more layers of the frame. In this embodiment, a region of the 2-D frame is segmented as described herein and stored as a separate file or layer of the 2-D frame in a computing system.

Figure 3:
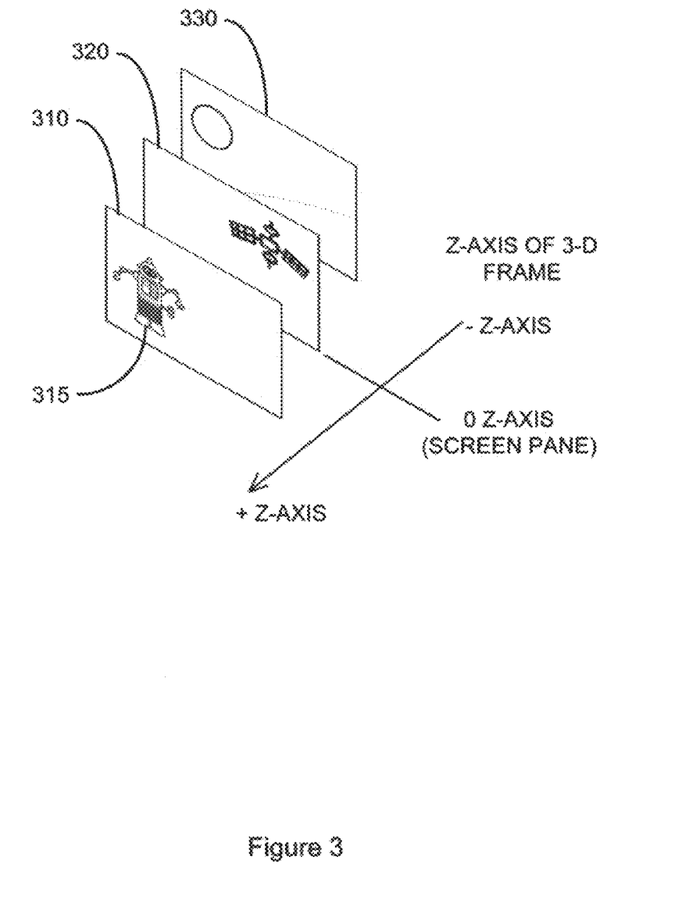
FIG. 3 is a diagram illustrating the position of several layers of a stereoscopic 3-D frame along a perceptual z-axis of the stereoscopic 3-D frame.

Upon extraction of a layer or otherwise obtaining layer pixel data, a user or the computing system may determine a pixel offset for the layer pixel data in operation 120. Each pixel, or more likely a collection of adjacent pixels, of the 2-D frame may have an associated pixel offset that determines the object's perceived depth in the corresponding stereoscopic 3-D frame. For example, FIG. 3 is a diagram illustrating the perceived position of several layers of a stereoscopic 3-D frame along a z-axis of the stereoscopic 3-D frame. As used herein, the z-axis of a stereoscopic 3-D frame or image represents the perceived position of a layer of the frame when viewed as a stereoscopic 3-D image. In one particular embodiment, any layer 310 of the stereoscopic 3-D frame appearing in the foreground of the frame has a corresponding positive z-axis position that indicates the position of the layer relative to the plane of the screen from which the stereoscopic 3-D frame is presented. Additionally, any layer 330 appearing in the background of the stereoscopic 3-D frame has a corresponding negative z-axis position while a layer 320 appearing on the plane of the screen may have a zero z-axis position. However, it should be appreciated that the layers of the frame are not physically located at a z-axis positions described herein. Rather, because the stereoscopic 3-D frame appears to have depth when viewed in stereoscopic 3-D, the z-axis position merely illustrates the perceived position of a layer relative to the screen plane of the stereoscopic 3-D frame. Though not a requirement, this position, and hence the screen plane in this example, very often corresponds to what is known as the point of convergence in a stereoscopic system. Further, it is not necessary that a positive z-axis position correspond to the layer appearing in the foreground of the stereoscopic 3-D frame and a negative z-axis position correspond to the layer appearing in the background. Rather, any value may correspond to the perceived position of the layer of the stereoscopic 3-D frame as desired. For example, in some computer systems, layers that are perceived in the background of the stereoscopic 3-D frame may have a positive z-axis position while those layers in the foreground have a negative z-axis position. In still another example, the zero z-axis position corresponds with the furthest perceived point in the background of the stereoscopic 3-D frame. Thus, in this example, every layer of the stereoscopic 3-D frame has a positive z-axis position relative to the furthest perceived point in the background. As used herein, however, a z-axis position value corresponds to the example shown in FIG. 3.

In the example of FIG. 3, each pixel of any particular layer of the 2-D frame has the same pixel offset. Thus, each object of the layer appears at the same z-axis position within the stereoscopic 3-D frame. Moreover, while each object, e.g. the moon 202, the satellite 204 and the planet 206, are given a z-axis depth, each object appears flat or with no volume. Stated differently, initially a pixel offset is applied uniformly to all pixels of a given object or layer. To provide a non-flat appearance of a given object and a more realistic stereoscopic 3-D effect, the pixel offset of one or more pixels of the layer is adjusted to add volume or a more detailed depth perception to the objects of the layer, or to otherwise provide non-uniformity to the object through variable pixel offsets.

For example, returning to FIG. 2, the moon 202 object has a round shape. While the stereoscopic depth of the moon layer 210 layer provides a stereoscopic depth as to the orientation of the moon in relation to the other shapes of the frame, the moon object itself still appears flat. Thus, to provide a volume stereoscopic 3-D effect to the moon 202 object, pixel offset for the pixels defining the moon object are adjusted such that the pixels of the moon are located either in the foreground or background of the stereoscopic 3-D frame in relation to the moon layer 210, or are not adjusted and are maintained at the moon layer, thereby providing the moon object with stereoscopic volume. Several techniques to apply volume to the layers of an frame are described in greater detail in related United States patent application titled "METHOD AND SYSTEM FOR CREATING DEPTH AND VOLUME IN A 2-D PLANAR IMAGE" by Tara Handy Turner et. al., Ser. No. 12/571,406, the entirety of which is incorporated by reference herein. This volume process may be applied to any layer of the 2-D frame, including being applied to one or more objects of a particular layer. Thus, the volume applied to one object of a particular layer may differ from the volume applied to a separate object of the same layer. Generally, the stereoscopic volume may be applied individually to any aspect of the 2-D frame. Moreover, stereoscopic volume may be applied to any given object irrespective of its relation to a layer or any other object.

Additional stereoscopic techniques for pixel offset may be utilized to provide this volumetric and depth detail to the stereoscopic 3-D effect applied to the 2-D frame. One such adjustment involves utilizing gradient models corresponding to one or more frame layers or objects to provide a template upon which a pixel offset adjustment may be made to one or more pixels of the 2-D frame. For example, returning to FIG. 2, it may be desired to curve the planet 206 object of the planet layer 230 such that the planet appears to curve away from the viewer of the stereoscopic 3-D frame. To achieve the desired appearance of the planet 206, a gradient model similar in shape to the planet 206 object may be selected and adjusted such that the gradient model corresponds to the planet object and provides a template from which the desired stereoscopic 3-D effect may be achieved for the object. Further, in those layers that include several objects of the 2-D frame, gradient models may be created for one or more objects such that a single stereoscopic 3-D effect is not applied to every object of the layer. In one embodiment, the gradient model may take the form of a gray scale template corresponding to the object, such that when the frame is rendered in stereoscopic 3-D, the whiter portions of the gray scale gradient model corresponds to pixels of the object that appear further along the z-axis position (either in the foreground or background) of the layer than the pixels of the object that correspond to the darker portions of the gradient model, such that the object appears to extend towards or away from the viewer of the stereoscopic 3-D frame. Several techniques related to creating depth models to render a 2-D frame in 3-D are described in greater detail in related United States patent application titled "GRADIENT MODELING TOOLKIT FOR SCULPTING STEREOSCOPIC DEPTH MODELS FOR CONVERTING 2-D IMAGES INTO STEREOSCOPIC 3-D IMAGES" by Tara Handy Turner et. al., Ser. No. 12/571,412, the entirety of which is incorporated by reference herein.

Once the desired depth pixel offset and the adjusted pixel offset based on a volume effect or gradient model are determined for each layer and pixel of the 2-D frame in operation 120, corresponding left eye and right eye frames are generated for each layer in operation 130 and shifted in response to the combined pixel offset in operation 140 to provide the different perspectives of the layer for the stereoscopic visual effect. For example, to create a left eye or right eye layer that corresponds to a layer of the 2-D frame, a digital copy of the 2-D layer is generated and shifted, either to the left or to the right in relation to the original layer, a particular number of pixels based on the pixel offset for relative perceptual z-axis positioning and/or individual object stereoscopic volume pixel offsetting. Hence, the system generates a frame copy of the layer information with the x-axis or horizontal pixel values shifted uniformly some value to position the object along a perceptual z-axis relative to other objects and/or the screen, and the system further alters the x-axis or horizontal pixel position for individual pixels or groups of pixels of the object to give the object stereoscopic volume. When the corresponding left eye and right eye frames are viewed simultaneously or nearly simultaneously, the object appearing in the corresponding frames appears to have volume and to be in the foreground or background of the stereoscopic 3-D frame, based on the determined pixel offset.

In general, the shifting or offsetting of the left or right eye layer involves the horizontal displacement of one or more pixel values of the layer. For example, a particular pixel of the left or right eye layer may have a pixel color or pixel value that defines the pixel as red in color. To shift the left or right eye layer based on the determined pixel offset, the pixel value that defines the color red is horizontally offset by a certain number of pixels or other consistent dimensional measurement along the x-axis or otherwise horizontal, such that the new or separate pixel of the layer now has the shifted pixel value, resulting in the original pixel horizontally offset from the copy. For example, for a pixel offset of 20, a pixel of the left or right eye layer located 20 pixels either to the left or the right is given the pixel value defining the color red. Thus, there is a copy of the pixel horizontally offset (x-offset) from the original pixel, both with the same color red, 20 pixels apart. In this manner, one or more pixel values of the left or right eye layer are horizontally offset by a certain number of pixels to created the shifted layer. As used herein, discussion of "shifting" a pixel or a layer refers to the horizontal offsetting between the original pixel value and its copy.

Figure 4:
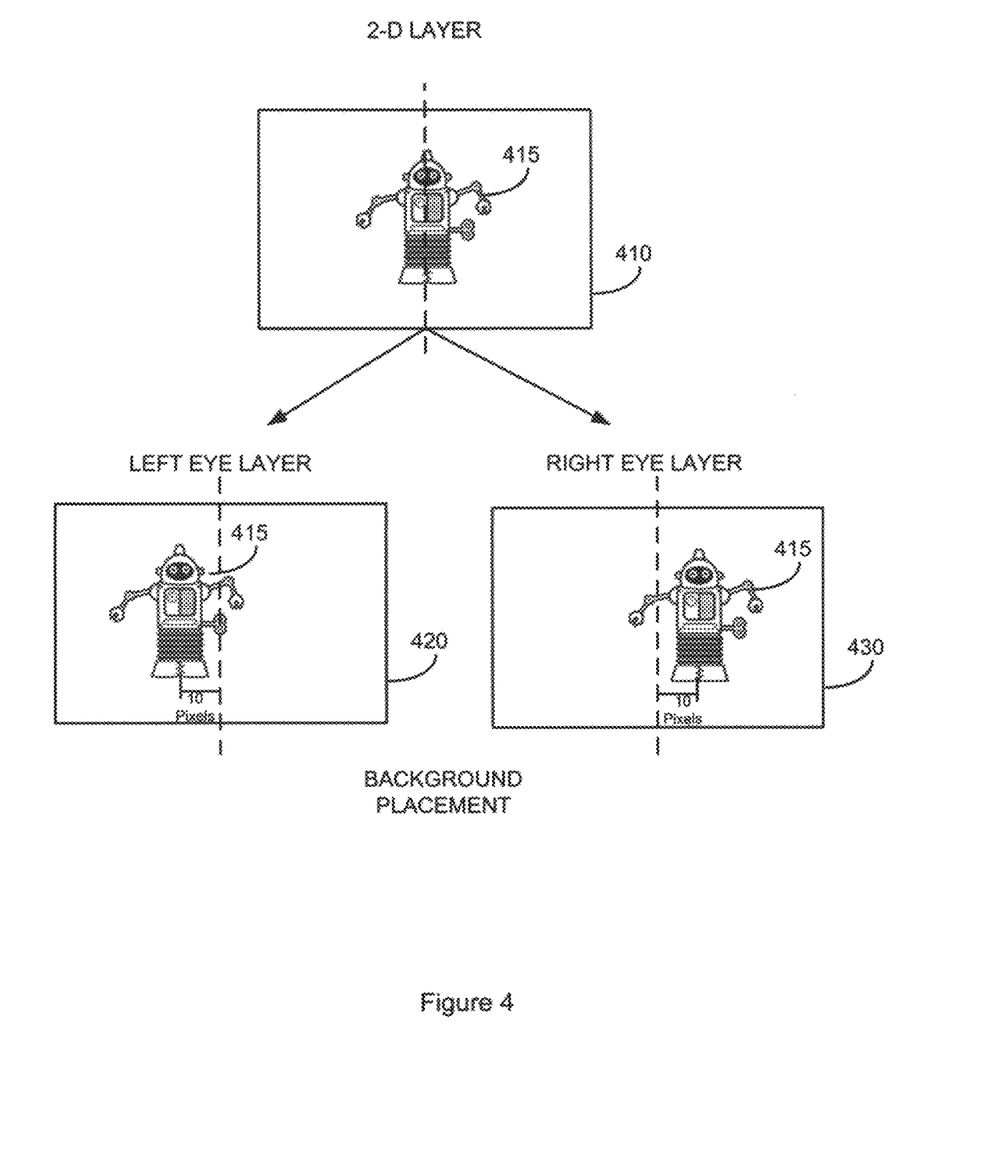
FIG. 4 is a diagram illustrating the creation of corresponding left eye and right eye image layers from a 2-D image layer, with both image layers shifted such that the total pixel shift of the image layers equals a determined pixel offset.

FIG. 4 is a diagram illustrating the creation of corresponding left eye and right eye layers from a 2-D layer, with both left eye and right eye layers shifted such that the total pixel shift of the layers equals the depth pixel offset. As shown in FIG. 4, a left eye layer 420 and a right eye layer 430 are created from the 2-D layer 410 such that the combination of the left eye layer and the right eye layer provides a stereoscopic 3-D effect to the contents of the layer. In this embodiment, the left eye layer 420 is shifted to the left while the right eye layer 430 is shifted to the right along the x-axis in response to a pixel offset. Generally, the shifting of the left eye and/or right eye layers occur in the x-axis only. When the shifted right eye layer 430 and the shifted left eye layer 420 are viewed together, the robot character 415 appears in the background, or behind the screen plane. To place a layer in the foreground of the stereoscopic 3-D frame, the corresponding left eye layer 410 is shifted to the right while the right eye layer 420 is shifted to the left along the x-axis. When the shifted right eye layer 420 and the shifted left eye layer 410 are viewed together, the robot character 415 appears in the foreground of the frame, or in front of the screen plane. In general, the depth pixel offset is achieved through the shifting of one of the left eye or right eye layers or the combined shifting of the left eye and the right eye layers in either direction.

The number of pixels that one or both of the left eye and right eye layers are shifted in operation 140 may be based on the depth pixel offset value. In one example, the pixel offset may be determined to be a 20 total pixels, such that the layer may appear in the background of the stereoscopic 3-D frame. Thus, as shown in FIG. 4, the left eye layer 420 may be shifted ten pixels to the left from the original placement of the 2-D layer 410, while the right eye layer 430 may be shifted ten pixels to the right. As can be seen, the robot character 415 of the left eye layer 420 has been displaced ten pixels to the left of the center depicted by the vertical dashed line while right eye layer 430 has been displaced to the right of center by ten pixels. Thus, the total displacement of the layers between the left eye layer 420 and the right eye layer 430 is 20 pixels, based on the determined pixel offset. It should be appreciated that the particular number of pixels that each layer is shifted may vary, as long as the number of pixels shifted for both layers equals the overall pixel offset. For example, for a 20 pixel offset, the left layer may be shifted five pixels while the right layer may be shifted 15 pixels. Shifting the left and right eye layers in this way will result in a slightly different perspective of the layer than shifting in equal amounts, but this result may generate a desired creative effect or may be negligible to the viewer while being advantageous for the purposes of simplifying an image processing step such as the extraction of the layer.

Returning to FIG. 1, in operation 150, the computer system adjusts the pixel offset of a layer or object based on a stereoscopic volume or applied gradient model. The system orients a given object or layer along a perceptual z-axis by generating a copy of the object or layer and positioning the object and its copy relative to each other along an x-axis or horizontally. The degree of relative positioning determines the degree of perceptual movement fore and aft along the perceptual z-axis. However, a given object initially appears flat as the object and its copy are uniformly displaced. To provide an object with stereoscopic volume and depth, portions of an object and the corresponding portion of the object copy are relatively positioned differently (more or less) than other portions of the object. For example, more or less x-axis pixel offset may be applied to some portion of an object copy relative to other portions of an object copy, to cause the perceived position of some portion of the object to be at a different position along the perceptual z-axis relative to other portions of the object when the left and right eye layers are displayed.

In one embodiment, a separate gray scale template is created and applied to an object of the 2-D frame such that, after application of the pixel offset to the left eye layer and the right eye layer at a percentage indicated by the gray scale value of the template image at that pixel location, the whiter portions of the gray scale correspond to pixels in the image that appear further in the foreground than the darker portions. Stated differently, the gray scale provides a map or template from which the adjusted pixel offset for each pixel of an object may be determined. In this manner, a stereoscopic volume is applied to an object. The same gray scale may be generated by utilizing one or more gradient modeling techniques.

Therefore, based on the determined depth pixel offset (which perceptually positions a layer along the perceptual z-axis of the stereoscopic 3-D frame) and the gradient model pixel offset (which adjusts the depth pixel offset for one or more pixels of an object to provide the object with the appearance of having volume and a more detailed depth), the left eye layer and right eye layer, and specific portions of the left and/or right eye layer, are shifted to provide the stereoscopic 3-D frame with the desired stereoscopic 3-D effect. Thus, in some embodiments, each pixel of a particular stereoscopic 3-D frame may have an associated pixel offset that may differ from the pixel offsets of other pixels of the frame. In general, any pixel of the 2-D frame may have an associated pixel offset to place that pixel in the appropriate position in the rendered stereoscopic 3-D frame.

Operations 110 through 150 may repeated for each layer of the 2-D frame such that corresponding left eye layers and right eye layers are created for each layer of the frame. Thus, upon the creation of the left eye and right eye layers, each layer of the frame has two corresponding layers (a left eye layer and a right eye layer) that is shifted in response to the depth pixel offset for that layer and to the volume pixel offset for the objects of the layer.

In operation 160, the computer system combines each created left eye layer corresponding to a layer of the 2-D frame with other left eye layers corresponding to the other layers of the 2-D frame to construct the complete left eye frame to be presented to the viewer. Similarly, the computer system combines each right eye layer with other right eye layers of the stereoscopic 3-D frame to construct the corresponding right eye frame. The combined left eye frame is output for the corresponding stereoscopic 3-D frame in operation 170 while the right eye frame is output for the corresponding stereoscopic 3-D frame in operation 180. When viewed simultaneously or nearly simultaneously, the two frames provide a stereoscopic effect to the frame, converting the original 2-D frame to a corresponding stereoscopic 3-D frame. For example, some stereoscopic systems provide the two frames to the viewer at the same time but only allows the right eye to view the right eye frame and the left eye to view the left eye frame. One example of this type of stereoscopic systems is a red/cyan stereoscopic viewing system. In other systems, the frames are provided one after another while the system limits the frames to the proper eye. Further, to convert a 2-D film to a stereoscopic 3-D film, the above operations may be repeated for each frame of the film such that each left eye and right eye frame may be projected together and in sequence to provide a stereoscopic 3-D effect to the film.

Various portions of a layer of the 2-D frame may have a depth pixel offset associated with the position of the layer in the stereoscopic 3-D frame and/or a volume pixel offset to provide an object or region of the layer with a perceptual position (e.g. at, fore or aft of a screen) and/or stereoscopic volume effect. For example, a layer of a 2-D frame may include a character object. Aspects of the present disclosure provide a user interface and method that allows discrete portions of an image to be identified and facilitate application of stereoscopic effects to the discrete portion. For example, it may be desired that the face of a character object has a separate stereoscopic volume effect from the body and arms that the face has a perceived roundness or volume in relation to the rest of the character object. In a similar manner, a character's arm may be stereoscopically inflated separately from the character's body such that the arm has a volume separate from that of the rest of the body. By providing a stereoscopic volume pixel offset to the certain regions of the character object separately, a more detailed stereoscopic effect of the character may appear to the viewer in the corresponding stereoscopic 3-D frame.

Figure 5:
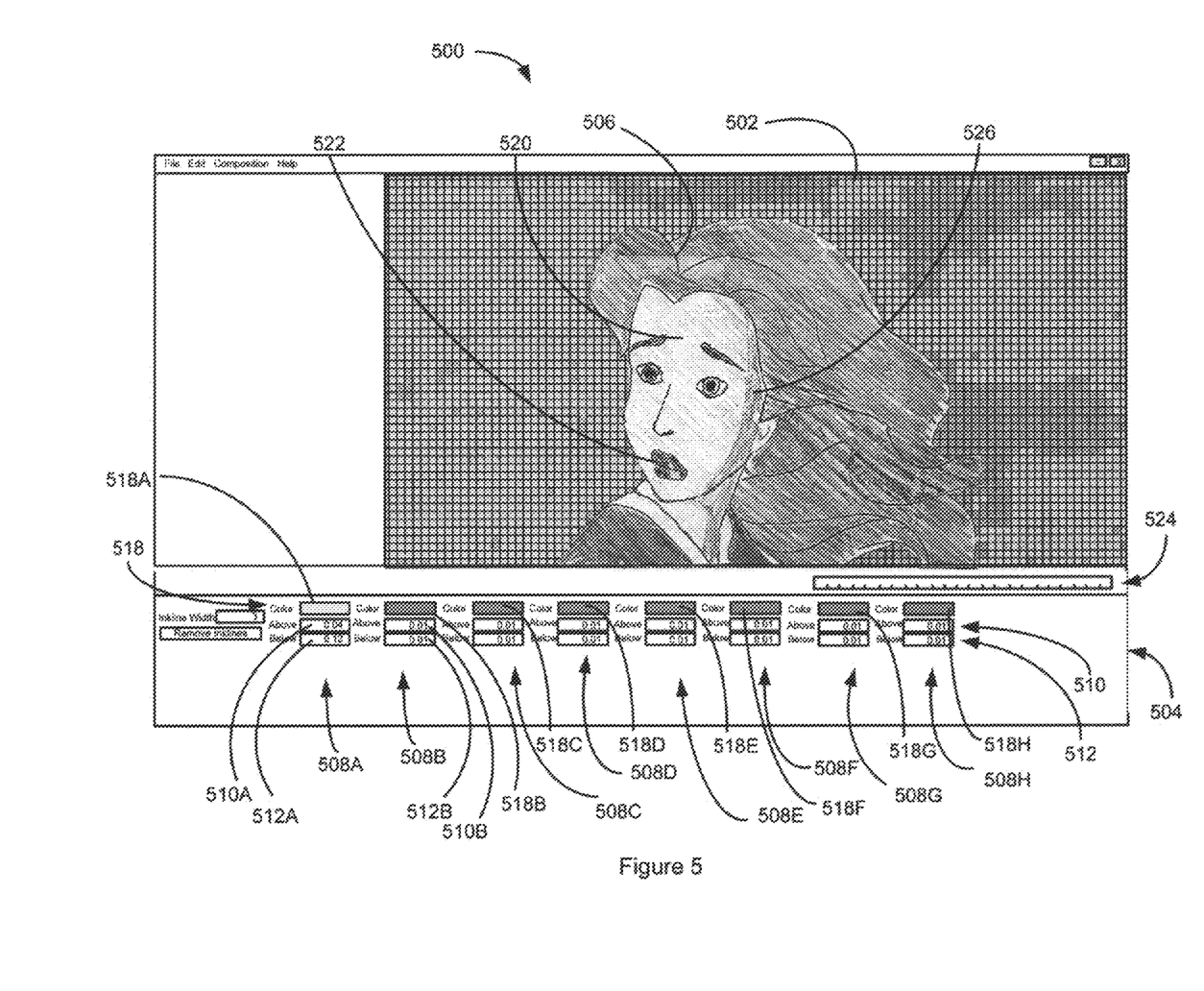
FIG. 5 is a diagram illustrating a user interface providing the user with the ability to select and segment regions of a layer or object based on pixel color.

One method to segment and isolate or otherwise select a region of a layer, image, object or other image to which stereoscopic effects are being applied is to utilize a computer system to select the region based on a color consistent of the region. FIG. 5 is a diagram illustrating a user interface providing the user with the ability to select and segment regions of a layer or object based on color by involving methods of identifying consistent color areas of the selected or otherwise identified region. The user interface shown also allows the user to identify and invoke methods of removing ink lines that may be included in the segmented region to provide a clean matte from which stereoscopic volume or other stereoscopic 3-D effect may be applied to the region.

The user interface 500 shown includes several interactive panels, including an image panel 502 and a control panel 504. The image panel 502 presents the content of a layer of the 2-D frame to the user. The displayed layer may contain all or some of a 2-D frame, such as an object of the 2-D frame or a portion of an object. In this example, the layer shown contains a character object 506 of an animated 2-D film. The character object has various typical image features, such as eyes, a nose, a mouth, hair, etc. The area of the image panel 502 not populated by the object is rendered in a cross hatch design to indicate those regions of the 2-D frame that are either non-existent or are masked out in this particular layer. In other words, the pixels in these areas of the layer are rendered transparent when combined with other layers or a background. However, it should be appreciated that the checkerboard area may be any color or design as recognized by the computer system to indicate the portion of the 2-D frame that is not included in the particular layer shown.

The control panel 504, in this embodiment located along the bottom of the interface 500, contains several indicators and controls for selecting and segmenting one or more regions of the layer shown in the image panel 502. For example, one control shown in the embodiment is a color selector 508A-508H. This particular embodiment includes eight such color selectors 508A-508H such that a user may identify up to eight separate colors to be included in a segmented region. Each color selector 508A-508H includes a color swatch 518, an upper tolerance text box 510 (designated "above" in the figure) and a lower tolerance text box 512 (designated "below" in the figure). While this example includes eight color selectors 508A-508H, the user interface 500 may include any number of color selectors that allow the user to select which pixel colors are included in the isolated region.

The color swatches 518 of the example shown in FIG. 5 include three separate pixel colors, which may be three separate color pixel values. For example, the first color swatch 518A includes a color that matches or is similar to the color of the pixels that define the face 520 of the character object. The pixel color that each color selector 508A-508H defines may be selected in a variety of ways. In one embodiment, the user utilizes an input device to a computer system to select a pixel of the layer 506 that the user desires to be included in the segmented region. For example, the user may use a mouse or other input device to select a pixel of the character's face 520 such that the color of the selected pixel appears in the first color swatch 518A of the first color selector 508A. In another embodiment, the user may provide the user interface 500 with the red, green and blue (RGB) values that define the desired pixel color to be selected. Upon input of the RGB values that define a particular pixel color, the color swatch 518 of one of the color selectors 508A-508H may indicate such a pixel color by taking on the input color. Similar to the first color swatch 518A, the second color swatch 518B of the embodiment shown includes a similarly selected pixel color. This particular color selector 508B selects the pixels that define character object's lips 522.

The remaining color swatches 518C-518H are a default color. In the example shown, the neon pink color is a default color that each color swatch 518 adopts until a particular pixel color is selected for that color selector 508. Thus, color swatches 518C-518H do not include a color that is represented in the layer 502, but rather remain at the default setting until a color is selected for each color selector. Any additional pixel colors of the layer 502 that are to be included in the segmented region are added to any of the color selectors 508A-508H that are not in use, either through the selection of the color from the layer or by entering the RGB value of the desired color. Further, each of the color selectors 508A-508H may be overridden by a newly selected color, such as in the situation where each color selector is in use and a new color is selected. In these situations, the user interface may include an instruction set to determine which color selector 508A-508H is overridden.

As stated, each color selector 508A-508H includes at least two text boxes, one displaying an upper tolerance 510 value and another displaying a lower tolerance 512 value. The tolerance values define the percentage of change from the selected color (shown in the associated color swatch 518A-518H) that a pixel may have and still be included by that color selector 508A-508H. In other words, the tolerance values displayed in the upper tolerance box 510 and the lower tolerance box 512 define the range of colors that a pixel may have and still be selected by that particular color selector 508A-508H. Thus, the larger the upper and lower tolerances, the more pixel colors that are selected from the color selector 508A-508H. Any pixel in the layer 506 with a color that falls within ranges defined by the tolerance values are selected in relation to that particular color selector 508A-508H.

Additional features may also be included in the user interface 500 to aid the user in the use of the region selection. For example, the user interface of FIG. 5 includes a layer information bar 524 that contains information about the selected layer. In one embodiment, several layers comprising a frame of a multimedia film are accessible by the user interface 500. Further, several frames comprising a scene of the film may also accessible by the interface 500. The layer information bar 524 provides the user with means for accessing the several layers and frames of the accessed film, as well as provide identifying information for the selected layer displayed in the image panel 502. Thus, by pressing a play button or utilizing a progress bar of the layer information bar 524, other layers and other frames can be accessed. In this manner, a user may toggle between several layers or frames of the multimedia film to segment several regions of the film. In addition, the user interface 500 may be configured to maintain the color selectors 508 between the several layers and frames such that the same pixel colors may be selected in the many layers and frames. Thus, through the layer information bar 524, the user may quickly segment regions of an entire scene or an entire film. The layer information bar 524 is but one example of the additional features that the user interface 500 may include. Generally, the user interface may include any additional features that aid the use of the user interface 500.

Through the user interface described, a user or animator can easily and quickly select a particular region of a layer of a 2-D image without selecting the rest of the image. For example, a user may select the skin region of the character object 520 without selecting the character's eyes, eyebrows, hair, etc. Segmenting certain regions of a 2-D layer is particularly useful when applying a stereoscopic volume effect to certain aspects of an object separately. For example, a stereoscopic volume effect is applied to the character object's face 520 separately from the rest of the character. Such effects may also be applied to the character's lips, nose, finger, etc. to provide a more detailed stereoscopic volumetric effect. Thus, by segmenting a region of an object of a 2-D image based on color, the various regions of an object are selected quickly and efficiently for application of a stereoscopic effect. Particularly applicable to flat, shaded 2-D animation characters, this effect may also be sued with any frame with color or grayscale information.

Figure 6:
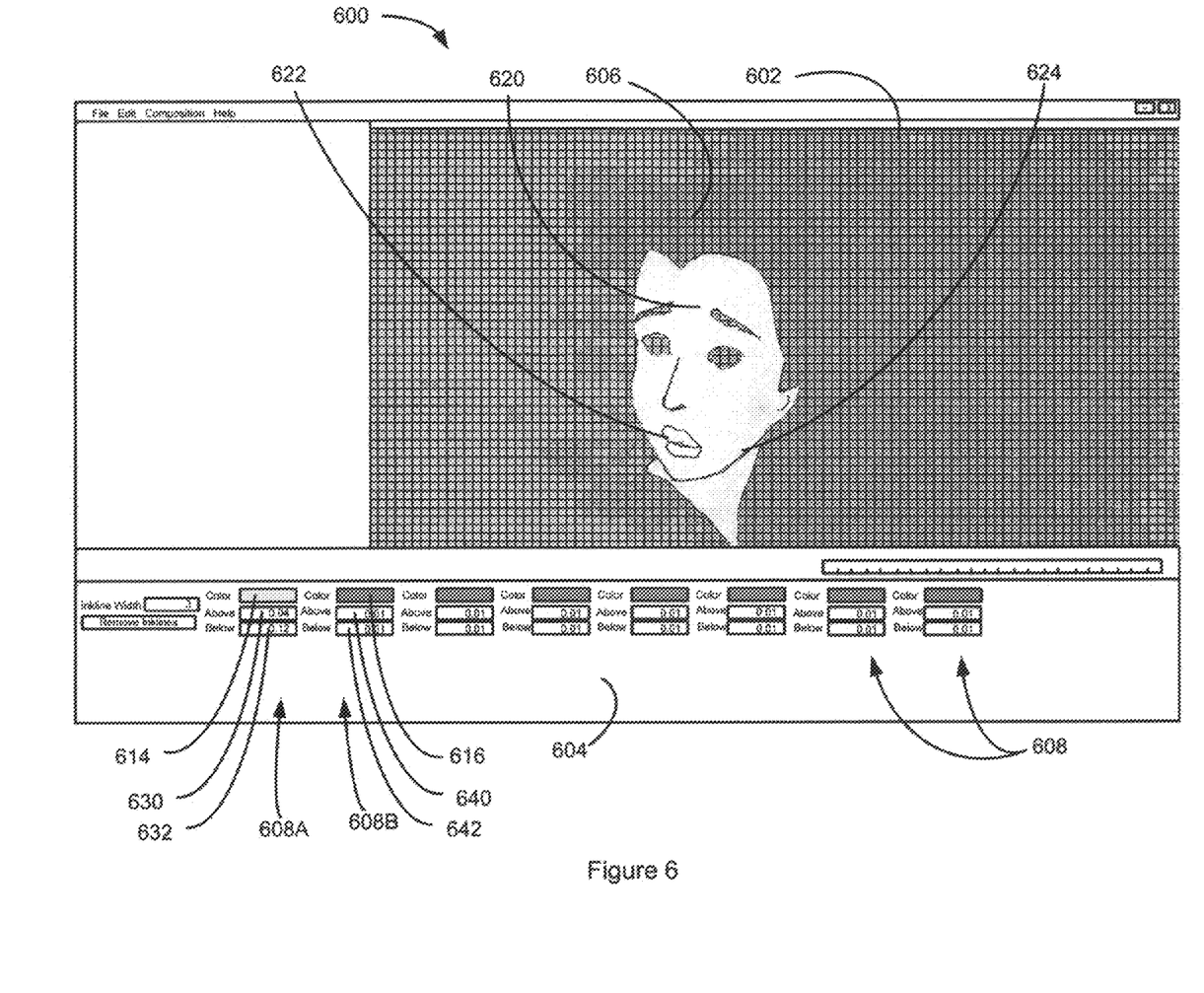
FIG. 6 is a diagram illustrating the user interface with several pixels that correspond with two selected colors of a layer selected and a corresponding matte indicated the selected colors.

FIG. 6 is a diagram illustrating a matte file displayed in the display panel 502, which is one example of the result of segmentation of the image 520 shown in FIG. 5. The user interface illustrated in FIG. 6 is the same user interface illustrated and discussed in FIG. 5. However, in FIG. 6, the pixels that are selected using the color selectors 608 are identified in the layer 608 shown in the image panel 602 and a corresponding all-white matte of those pixels is displayed.

The color swatch 614 of the first color selector includes a flesh tone color that is similar to the color of the pixels of the character's face 520 in FIG. 5. The color swatch 616 of the second color selector includes a pink color, similar to the color of the pixels of the character's lips 522 in FIG. 5. Thus, the first color selector 608A selects the pixels of the layer 606 that match or closely resemble the flesh tone color and the second color selector 608B selects the pixels of the layer 606 that match or closely resemble the pink color. In the diagram of FIG. 6, the selected pixels, along with pixels above and below the selected values, are identified by the white-only matte 620 displayed in the image panel 602. The matte 620 includes the same number of pixels located in the same locations as the original layer. In one example, the matte 620 represents the alpha channel for the selected regions of the layer. However, the pixels of the matte 620 have had all color removed such that the matte represents an all-white copy of the segmented pixels. Thus, the pixels associated with the character's face 620 and lips 622 are converted into white pixels. Further, those pixels that do not fall within the range of colors defined by the color selectors 608 are not shown in the image panel 602, but are rendered transparent, as shown in this example with the crosshatch pattern representing the background of the layer, such that only the selected pixels remain in the image panel. It should be appreciated that the pixels that define the matte 620 may include any color, not just white.

Returning to FIG. 5, the character's face 520 not only includes pixels that exactly match the color of the first swatch 518A, but also includes other various shades of the selected color similar to the first color swatch. For example, the character's face 520 includes shaded regions 526 indicating a shading effect for the object 506. The pixels defining the shaded region 526 are similar in color to the character's face 520, but with a darker shade than other regions of the character's face 520. Thus, while these pixels are similar to the selected color of the first swatch 518A, they do not match the selected color exactly. However, it may be desired that such pixels be included in the segmented region as the stereoscopic 3-D effects intended for the character's face 520 also be applied to the shaded region 526 to achieve a uniform stereoscopic effect for the character's face. To provide the same stereoscopic volume effect to the full face, including regions 520 and 526, the user interface includes an upper tolerance and lower tolerance that define the range of colors that each color selector captures. Hence, the user may segment the entire face by clicking on location 520 to populate selector 518A with the color at location 520 and defining a tolerance range that is sufficient to capture the shaded area 526. In some digital systems, some or all of the shading layer may be separate and can be ignored for the purposes of segmentation but included before applying stereoscopic treatment to the final image. Other images, such as live action frames, generally do not contain a separate shading layer.

The first color selector 518A includes an upper tolerance text box 510A that allows a user to define an upper tolerance for that particular color selector. In the example shown, the upper tolerance value is set at 0.04. A corresponding lower tolerance text box 512A is also provided, allowing the user to define a lower tolerance for the color selector. In the example shown, the lower tolerance is set at a value of 0.12. These tolerances define an upper bound and lower bound of a range of colors surrounding the color of the first color swatch 518A such that the range of colors is included in the pixels selected by the first color selector. The values of the upper and lower tolerance define the percentage of change from the selected color shown in the color swatch 518A. For example, pixels of the layer 506 that are within 4% above the selected color are also selected by that particular color selector 508A. Also, pixels of the layer 506 that are within 12% below the selected color are selected by the color selector 508A. To receive the percentage value for any range, an rgb-based value is considered. In one example, the color value of red, green and blue channels of an rgb-based system are represented as a value in a range between 0 and 1, where 0 across the three color indicators (red, green, blue) indicates black and 1 across the three indicators indicates white. In this case, a value of 0.12 is equivalent to 0.12/1, or 12%. In systems where integer values are used for the red, green and blue values, such as an 8 bit system where 0 across the color indicators is black and 256 across the indicators is white, the range variable could be entered in any number of ways, including percentage as well as discrete values. For example in a 0-256 valued red, green, blue system, a value of 0.25 or 25% in a percentage based input configuration would indicate a variation of as much as 64 levels in the red, green and blue channels. In a different embodiment, the value 64 may be indicated directly as a discrete value. Also, in this example the range applies uniformly across the red, green and blue colors of an image. It is not a requirement that the application be uniform and another embodiment may allow the user to enter ranges individually for each color red, green and blue or other color representations.

Thus, by expanding the range of colors that the first color selector identifies, the shaded regions 526 of the character's face 520 are included in the pixels that are identified by the first color selector. The second color selector 508B also has an upper tolerance text box 5108 and a lower tolerance text box 512B. However, in the example shown in FIG. 5, the upper and lower tolerances of the second color selector are set at default values of 0.01. Thus, the second color selector 508B may only identify those pixels that exactly match or closely match (within 1%) the color of the second color swatch 518B. In contrast, the tolerances for the first color selector 508A are set at a higher value such that the first color selector includes a wider range of flesh tone colored pixels. As should be appreciated, the higher the tolerance values provided for each color selector, the larger the range of pixel colors each color selector may identify.

In an alternate embodiment, the user interface provides a color palette to the user from which the user selects the tolerance ranges for a particular color selector. The color palette includes various shades of a pixel color relating the selected color for that color selector. For example, the user interface provides a color palette including several shades of flesh toned pixel colors in response to the user selecting the flesh tone color for the first color selector 508A. The user then selects those shades of flesh tone pixel colors that are included in the first color selector 508A to define the upper and lower tolerances. The percentage change that define the upper and lower tolerances is then populated by the user interface.

Once the matte 620 is created, a stereoscopic volume effect may be applied utilizing the matte. In particular, the matte 620 is utilized to create a gray scale template from which a stereoscopic volume effect is then applied to the object. In one example, the gray scale template includes pixels defining the segmented region and provides pixel offset values that correspond to a particular shade of the gray scale. These pixel offset values are then applied to the pixels of the segmented region to provide the object with stereoscopic volume.

Figure 7:
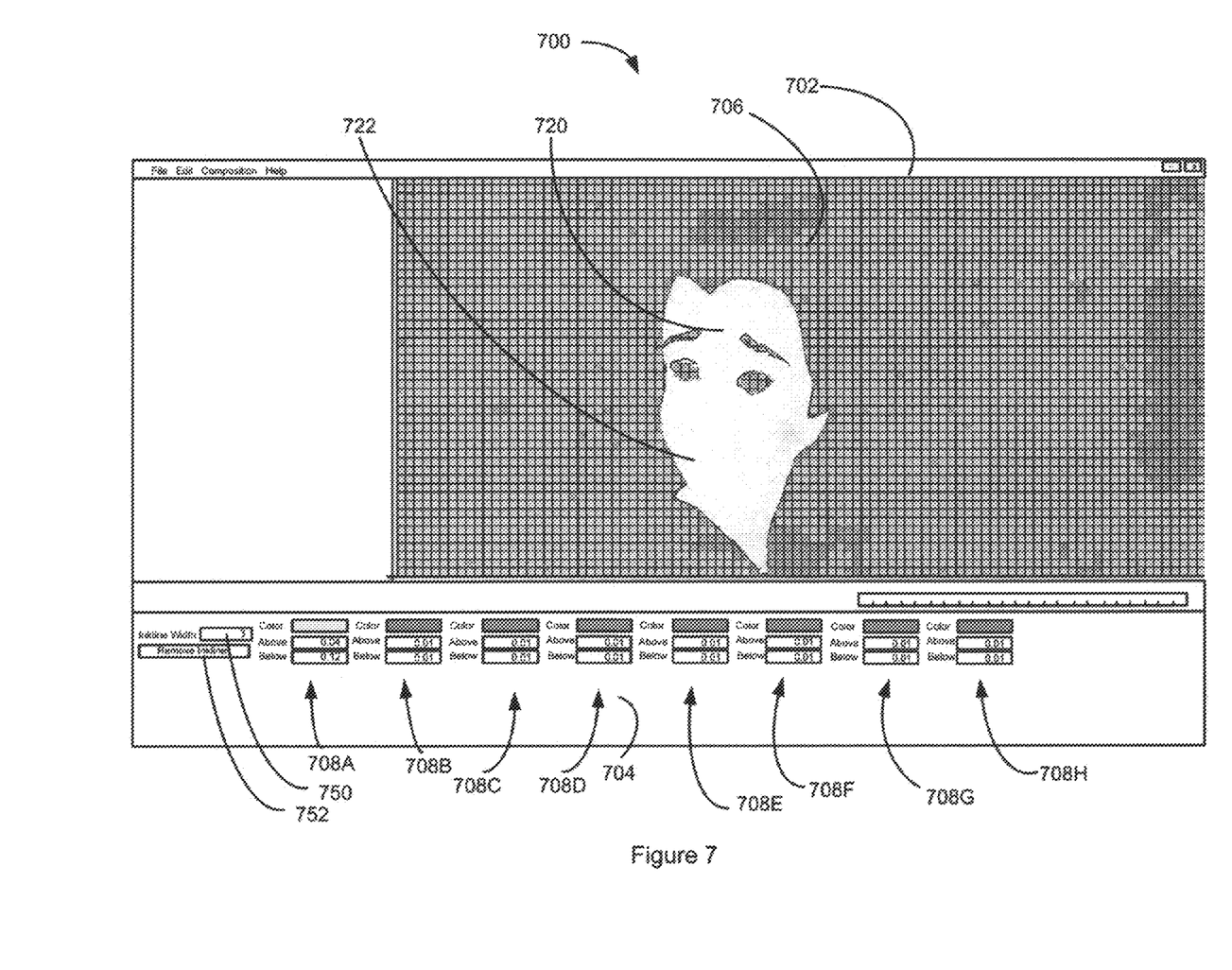
FIG. 7 is a diagram illustrating the user interface including segmented regions with the ink lines of the regions removed.

Returning to FIG. 6, several of the regions of the object that define the ink lines that separate and define regions of the layer 606 can be seen in the image panel 602. For example, the ink line defining the jaw line 624 of the character 620 is not included in the matte 620 as indicated by the non-white pixel value in this example, indicating transparency. However, these breaks in the segmented region affect the application of a stereoscopic volume effect to the matte 620 and the corresponding segmented region. For example, a stereoscopic volume effect applied to the matte 620 in FIG. 6 may warp around the ink lines, such as at the character's jaw line 624 and around the character's nose. Thus, to provide a uniform volume effect to the segmented region, it may be desired to fill in the portions of the matte 620 where an ink line separates the matte. The user interface 600 includes such an ink line removal tool that fills in the areas in the matte 620 that were previously occupied by the ink lines. FIG. 7 is a diagram illustrating the user interface including the segmented region from FIG. 6 with the ink lines of the image removed from the matte.

The user interface illustrated in FIG. 7 is the same user interface illustrated and discussed in FIGS. 5 and 6. However, in FIG. 7, the pixels that define the ink lines of the selected region 720 are filled in with the matte color (white in the case shown). To identify and remove the ink lines from the selected region 720, the user interface 700 may include a "Ink line Width" text box 750 and a "Remove Ink lines" activation button 752. The ink line width text box 750 defines the width, in pixels, of the matte 720 that is considered an ink line when surrounded by selected color regions. The activation button 752 is pressed by a user through an input device to the computer system, such as a mouse and pointer, to fill the identified ink lines within the matte 720.

To identify the ink lines of the matte 720, the computer system utilizes the ink line width defined in the ink line width text box 750. For example, the embodiment shown in FIG. 7 provides for a ink line width of three pixels. However, the ink line width may be set at any number of pixels. To utilize the ink line width, the computer system begins by identifying those pixels of the layer that are encompassed by one or more of the colors of the color selectors 708A-708H and creating a matte 720 of the identified pixels. Next, the computer system analyzes the layer to determine those areas not included in the matte 720 that are surrounding in any of four directions by a matte pixel and whose width is equal to or less than the set ink line width value. In other words, when two similarly colored pixels are separated by a number of pixels equal to or less than the ink line width value, then the ink line pixels are then included in the matte 720. As can be seen in FIG. 7, the image panel 702 has filled in the ink lines that define the character's nose, lips, ears and jaw line. Thus, based on the ink line width text box, these ink lines which are three pixels in width or less and are surrounded by selected colors in at least one of four directions are now included as part of the matte 702. In contrast, because the width of the eyebrows is larger than the defined ink line width, the pixels defining the character's eyebrows are not included in the matte 720. To include the eyebrows of the character in the matte 720, the ink line width may be increased to match the pixel width of the eyebrows. In this manner, the ink line width may be adjusted to include more or less of the layer as desired.

In an alternate embodiment, regions of the 2-D frame are selected based on a pixel color though a control point. In this embodiment, the user selects a control point within the layer. The region is then defined by radiating out from the selected control point to include all pixels with a similar color as the control point pixel in a contiguous region. Thus, in this case, the region is bounded at any pixel that is not similar in color to the control point pixel. For example, if a pixel of the character's face of the examples shown is selected as the control point, the region is defined as the pixels of the characters face bounded by the ink lines (as the pixels of the ink lines have a different color than the control point pixel). Thus, not every pixel of the layer that is similar in color to the control point is a part of the selected region. For example, the character's neck and finger are not be included in the selected region as these portions of the layer are separated from the character's face by an ink line. Several aspects of these embodiment are definable. For example, the color values that are included in the region may be defined by a range of colors, as described herein. Thus, the shaded areas of the character's face may be included in the defined region by providing for a range of selected colors. In addition, the defined region may radiate from the control point may in either four or eight directions. Through this embodiment, several regions of the layer may be selected and segmented as desired.

Figure 8:
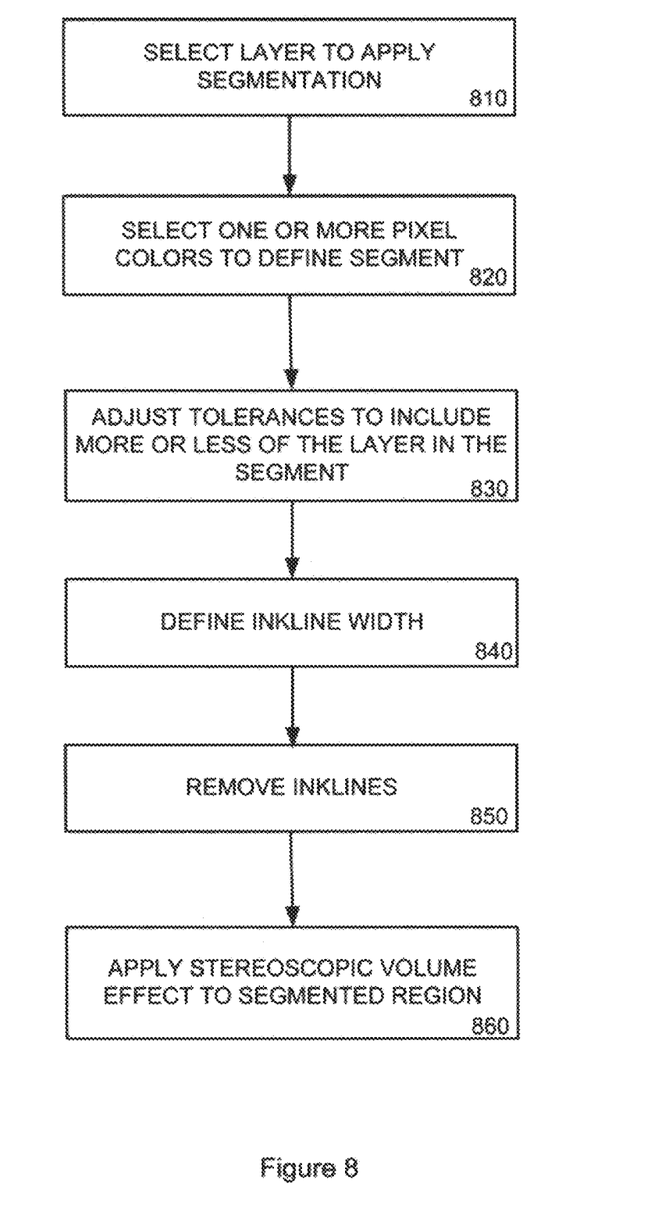
FIG. 8 is a flowchart of a method for utilizing a user interface to segment regions of a layer or object of a 2-D image based on pixel color.

FIG. 8 is a flowchart of a method for utilizing a user interface to segment regions of a layer or object of a 2-D image based on pixel color. In one embodiment, the operations are performed by an artist or animator as part of a process to convert one or more 2-D images to stereoscopic 3-D images. In another embodiment, the operations of the method may be performed by one or more computer systems.

Beginning in operation 810, the animator selects a layer of a 2-D frame from which a region of the frame will be segmented. As described, the layer may comprise one or more objects of the 2-D frame, or may include a portion of an object. Once selected, the layer is loaded into the user interface and appears in the image panel.

Once the layer is selected, the animator selects one or more pixel colors that represent the regions of the layer that is to be segmented. The user may select the colors by selecting the color directly from the image panel of the user interface or may enter RGB values to designate a pixel color to be included in the segmented region. Generally, upon selection, the selected pixels color appears in one or more color selectors located in the control panel of the user interface.

The selected colors may be further tuned by the animator or computer system in operation 830 by adjusting the upper and lower tolerances to define a range of pixel colors for each color selector. In one embodiment, the animator defines a color of the layer that is desired to be segmented. In response, the computer system analyzes the colors of the pixels of the entire layer and creates a color selector to match the defined region. In particular, the computer system defines a base color and sets the upper and lower tolerances to encompass the defined region. In another embodiment, the user sets the upper and lower tolerances until the desired number of pixels of the layer is achieved.

In addition, the animator defines an ink line width in operation 840. As described, the ink line width defines the width, in number of pixels, that the computer system may use to identify ink lines, separately from other features of the layer. In an alternate embodiment, the computer system may set the ink line width in response to the average ink line width of the selected layer.

In operation 850, the computer system removes the ink line from the corresponding matte of the segmented region and fills in the pixels of the ink line with the matte color. In an alternate embodiment, the user may utilize an input to the computer system to remove the ink lines by pressing an activation button included in the user interface. Thus, through the use of this method, an animator or computer system may segment certain regions of a 2-D image based on pixel color as part of a stereoscopic process.

In operation 860, the computer system applies a stereoscopic volume effect to the segmented region. The volume effect is described in greater detail in related application title "METHOD AND SYSTEM FOR CREATING DEPTH AND VOLUME IN A 2-D PLANAR IMAGE." The segmentation process of FIG. 8 provides a clean matte of a segmented object to which the stereoscopic volume effect is applied. In one example, the clean matte may animate over several frames of an animated film in direct correlation with the object of the frames. Thus, the matte animates similar to the animation of the corresponding region that defines the matte. In addition, any of the variables described herein may be animated or key-framed to account for a change in color over time. For example, the face color may grow lighter due to a lighting effect in subsequent frames. In such a case, an artist or operator selects and key-frames a new initial color value or uses additional color selectors to create a contiguous matte across all frames of the animation.

Figure 9:
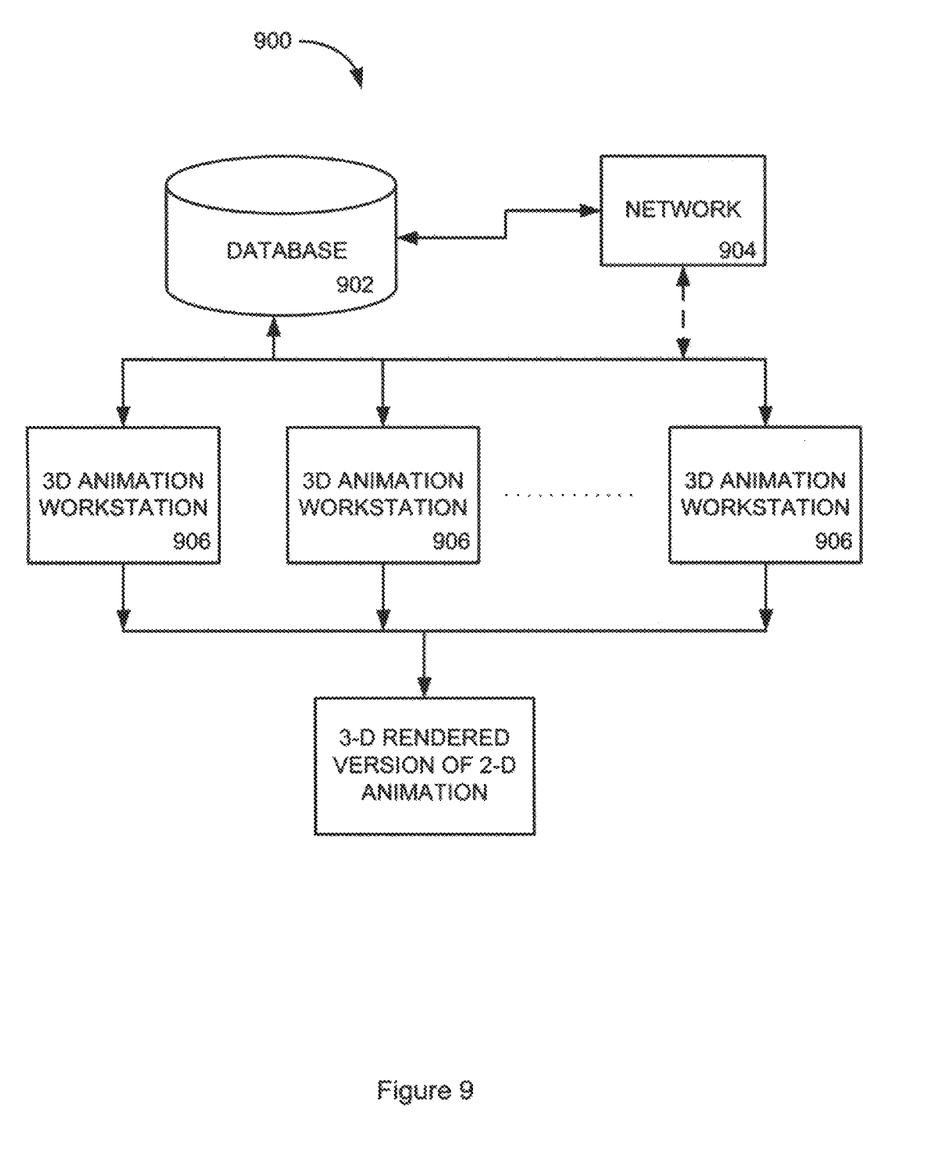
FIG. 9 is a high-level block diagram illustrating a particular system for converting a 2-D image of a multimedia presentation to a 3-D image, including a user interface for segmenting one or more regions of the 2-D image.

FIG. 9 is a high-level block diagram illustrating a particular system 900 for presenting a user interface to a user that provides the functionality of segmenting one or more regions of a 2-D frame. The system described below may perform one or more of the operations described above with reference to FIGS. 1 and 8.

The system 900 may include a database 902 to store one or more scanned or digitally created layers for each image of the multimedia presentation. In one embodiment, the database 902 may be sufficiently large to store the many layers of an animated feature film. Generally, however, the database 902 may be any machine readable medium. A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory. Common forms of machine-readable medium may include, but are not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. Alternatively, the layers of the 2-D images may be stored on a network 904 that is accessible by the database 902 through a network connection. The network 904 may comprise one or more servers, routers and databases, among other components to store the image layers and provide access to such layers. Other embodiments may remove the database from the system 900 and extract the various layers from the 2-D image directly by utilizing the one or more computing systems.

The system 900 may also include one or more computing systems 906 to perform the various operations to convert the 2-D images of the multimedia presentation to stereoscopic 3-D images. Such computing systems 906 may include workstations, personal computers, or any type of computing device, including a combination therein. Such computer systems 906 may include several computing components, including but not limited to, one or more processors, memory components, I/O interfaces, network connections and display devices. Memory and machine-readable mediums of the computing systems 906 may be used for storing information and instructions to be executed by the processors. Memory also may be used for storing temporary variables or other intermediate information during execution of instructions by the processors of the computing systems 906. In addition, the computing systems 906 may be associated with the database 902 to access the stored image layers. In an alternate embodiment, the computing systems 906 may also be connected to the network through a network connection to access the stored layers. The system set forth in FIG. 9 is but one possible example of a computer system that may employ or be configured in accordance with aspects of the present disclosure.

It should be noted that the flowcharts of FIGS. 1 and 8 are illustrative only. Alternative embodiments of the present invention may add operations, omit operations, or change the order of operations without affecting the spirit and scope of the present invention.

The foregoing merely illustrates the principles of the invention. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the invention and are thus within the spirit and scope of the present invention. From the above description and drawings, it will be understood by those of ordinary skill in the art that the particular embodiments shown and described are for purposes of illustrations only and are not intended to limit the scope of the present invention. References to details of particular embodiments are not intended to limit the scope of the invention.

What is claimed is:

1. A method of generating stereoscopic images from a two dimensional planar image, the method comprising:
    obtaining from a non-transitory computer readable medium an image comprising a plurality of regions representing a plurality of color values;
    identifying a particular color value with one of the plurality of regions;
    identifying each portion of the image that represents a color value within a range of the particular color value; and
    applying a stereoscopic volume to the identified portion of the image by a computer system.

2. The method of claim 1 further comprising:
    generating a matte representing the identified portion of the image; and
    applying a uniform color value to the identified portion.

3. The method of claim 2 wherein at least one of the plurality of regions defines an ink line of the image and the method further comprising:
    converting the ink line region to the uniform color value of the matte.

4. The method of claim 2 wherein the converting operation comprises:
    obtaining an ink line width value corresponding to a maximum number of pixels of the width of the ink line;
    identifying one or more portions of the selected regions that are separated by the ink line width value or less; and
    converting the ink line region to the uniform color value of the matte.

5. The method of claim 1 wherein the range of the particular color value is defined by an upper color value and a lower color value, the upper and lower color values corresponding to a percentage change from the particular color value.

6. The method of claim 1 wherein the identifying the particular color value comprises:
    receiving an indication of a red, green and blue (RGB) value of the particular color value.

7. The method of claim 3 wherein the upper color value and the lower color value is determined from the color values of one or more of the plurality of regions, and wherein the operation of applying a stereoscopic volume to the identified portion of the image comprises: generating a duplicate of the portion of the image that represents a color value within a range of the particular color value; and
    non-uniformly offsetting pixels values of the duplicate relative to the identified portion so that when the duplicate and the identified portion are displayed substantially at the same time to a viewer using stereoscopic viewing equipment, the identified portion has perceptual volume.

8. A machine-readable storage medium, the machine-readable storage medium storing a machine-executable code that, when executed by a computer, causes the computer to perform the operations of:
    displaying a user interface comprising a image panel configured to display a two dimensional digital image comprising a plurality of discrete color regions;
    receiving a selection of one of the plurality of discrete color regions from an input device, each pixel of the one of the discrete color regions having a first color value;
    identifying all pixels of the two dimensional digital image having a color value within a range defined by percentage of color change from the first color value;
    generating a matte based on the identifying of all pixels, the matte retaining the shape of the identified pixels and applying a uniform pixel color to all of the pixels of the matte;
    displaying the matte in the image panel; and
    applying a stereoscopic volume using the matte.

9. The machine-readable storage medium of claim 8, wherein the machine-readable code further causes the computer to perform the operations of:
    displaying a control panel configured to receive an upper color value and a lower color value, wherein the upper color value and lower color value define the range.

10. The machine-readable storage medium of claim 8, wherein the machine-readable code further causes the computer to perform the operations of:

identifying an ink line in the selected discrete color region; and removing the ink line from the matte.

11. The machine-readable storage medium of claim 10, wherein the machine-readable code further causes the computer to perform the operations of:

receiving an ink line width through the ink line control panel;

identifying one or more of the plurality of color regions as an ink line based on the ink line width value; and converting the ink line pixel values to the uniform pixel color of the matte.

12. The machine-readable storage medium of claim 8 wherein the receiving operation comprises receiving a red, green and blue (RGB) value for the one of the plurality of discrete color regions, the RGB value corresponding to the first color value.

13. The machine-readable storage medium of claim 8 wherein the receiving operation comprises receiving a indication of the one of the plurality of discrete color regions through a mouse input device.

14. The machine-readable storage medium of claim 10, wherein the machine-readable code further causes the computer to perform the operations of:

receiving a selection of a second of the plurality of discrete color regions from an input device, each pixel of the second of the discrete color regions having a second color value;

identifying all pixels of the two dimensional digital image having a color value within a range defined by percentage of color change from the second color value;

adding the identified pixels within the range of the second color value to the matte, the matte retaining the shape of the identified pixels and applying a uniform pixel color to all of the pixels of the matte.

15. A system for generating a stereoscopic frame comprising:

a database configured to store a two dimensional frame comprising a plurality of pixels defining a plurality of discrete color regions; and one or more computing systems associated with the database to access the two dimensional frame, the computing systems configured to perform the operations of:

retrieving the plurality pixels of the two dimensional frame;

generating a user interface configured to manipulate the plurality of pixels;

receiving an identification of a point within one of the plurality of discrete color regions;

identifying a color value associated with the point;

identifying all pixel values of the plurality of pixels having a value within a set range of the color value; and generating a matte based on the identifying of all pixel values, the matte retaining all pixel values having a value within the range of the color values and applying a uniform pixel value to all of the matte pixels.

16. The system of claim 15 further comprising:

a display device configured to display the user interface to a user of the system; and a network configured to store the two dimensional frame, wherein the database is further configured to retrieve the two dimensional frame from the network.

17. The system of claim 15 wherein the one or more computing systems further comprise a network connection, the one or more computing systems further configured to retrieve the two dimensional frame from a network through the network connection.

18. The system of claim 15 further comprising:

an input device for providing the control point within the one of the plurality of discrete color regions.

19. The system of claim 15 wherein at least one of the plurality of color regions includes an ink line and the one or more computing systems are further configured to perform the operations of:

receiving an ink line width value corresponding to a maximum number of pixels of the ink line; and identifying one or more of the plurality of color regions as an ink line based on the ink line width value.

20. The system of claim 15 wherein the computing system is further configured to:

generate a stereoscopic depth template for the matter, the stereoscopic depth template comprising a plurality of depth attributes that non-uniformly offset pixel values in a duplicate of the plurality of pixel values, the duplicate and the plurality of pixel values when displayed substantially contemporaneously provide a viewer with a perception of volume for a least a portion of the layer.

* * * * *